(12) United States Patent  (10) Patent No.: US 7,142,275 B2
Sakai  (45) Date of Patent: Nov. 28, 2006

(54) ELECTRO-OPTIC DEVICE HAVING MULTI-LAYER CONDUCTIVE LAYER, METHOD OF MANUFACTURING THE SAME, AND ELECTRONIC APPARATUS

(75) Inventor: Kazuyoshi Sakai, Misato-mura (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 10/691,438

(22) Filed: Oct. 22, 2003

(65) Prior Publication Data

US 2004/0114073 A1  Jun. 17, 2004

(30) Foreign Application Priority Data

Oct. 25, 2002  (JP) .............................. 2002-311053

(51) Int. Cl.
*G02F 1/1343* (2006.01)
(52) U.S. Cl. .................... 349/147; 349/113; 349/139; 349/148; 349/152
(58) Field of Classification Search ................ 349/113, 349/138, 147, 148, 139, 152
See application file for complete search history.

(56) References Cited

U.S. PATENT DOCUMENTS

| | | | | |
|---|---|---|---|---|
| 5,187,604 | A * | 2/1993 | Taniguchi et al. | 349/152 |
| 5,280,373 | A * | 1/1994 | Ozawa et al. | 349/86 |
| 5,667,853 | A * | 9/1997 | Fukuyoshi et al. | 428/1.62 |
| 6,081,310 | A | 6/2000 | Katsuya et al. | |
| 6,249,082 | B1 * | 6/2001 | Fukuyoshi et al. | 313/479 |
| 6,522,378 | B1 * | 2/2003 | Mizuno et al. | 349/139 |
| 6,747,723 | B1 | 6/2004 | Hanakawa et al. | |
| 2002/0005928 | A1 | 1/2002 | Hanakawa et al. | |

FOREIGN PATENT DOCUMENTS

| | | |
|---|---|---|
| JP | 02-037326 | 7/1990 |
| JP | 09-304787 | 11/1997 |
| JP | 09-305126 | 11/1997 |
| JP | 2000-147540 | 5/2000 |
| JP | 2002-049032 | 2/2002 |
| JP | 2002-049033 | 2/2002 |
| JP | 2002-049034 | 2/2002 |
| JP | 2002-049035 | 2/2002 |
| JP | 2002-116312 | 4/2002 |
| JP | 2002-229050 | 8/2002 |
| JP | 2002-258304 | 9/2002 |
| KR | 1999-67926 | 8/1999 |
| KR | 2001-0107725 | 12/2001 |
| TW | 439150 | 6/2001 |

OTHER PUBLICATIONS

Communication from Korean Patent Office re: related application. No translation.
Communication from Korean Patent Office regarding counterpart application.

(Continued)

*Primary Examiner*—Andrew Schechter
(74) *Attorney, Agent, or Firm*—Harness, Dickey & Pierce, P.L.C.

(57) ABSTRACT

A liquid crystal display device is provided which includes a rear base member having a substrate on which reflecting electrodes each comprising a laminate of an underlying conductive layer composed of a conductive metal oxide such as ITO or the like, a reflective conductive layer composed of silver or a silver alloy, and a transparent conductive layer composed of a transparent conductor such as ITO or the like are formed. The transparent conductive layer is thinner than the underlying conductive layer. The thickness of the transparent conductive layer is preferably in the range of 5 nm to 30 nm.

6 Claims, 9 Drawing Sheets

OTHER PUBLICATIONS

Communication from Japanese Patent Office regarding related application.
Communication from Japanese Patent Office regarding counterpart application. No translation.
Communication from Taiwanese Patent Office regarding related application. No translation.
Abstracts of Japan for JP09-123337.

* cited by examiner

ELECTRO-OPTIC DEVICE HAVING MULTI-LAYER CONDUCTIVE LAYER, METHOD OF MANUFACTURING THE SAME, AND ELECTRONIC APPARATUS

BACKGROUND OF THE INVENTION

1. Technical Field

The present invention relates to an electro-optic device, a method for manufacturing the same, and an electronic apparatus, and particularly, it relates to a structure of an electro-optic device suitable as a display device comprising a light reflecting layer.

2. Related Art

A liquid crystal display device, which is an electro-optic device, is widely used as display means provided on various electronic apparatuses. The liquid crystal display device has a basic cell structure in which a liquid crystal is sealed between a pair of substrates. A reflective liquid crystal display device partially using external light as display light is generally known as such a liquid crystal display device and conventionally mainly used for a portable electronic apparatus. In recent years, a transflective liquid crystal display device capable of a transmissive display using a black light in the dark and a reflective display using external light in lit areas has been provided in the market.

In the reflective liquid crystal display device or transflective-liquid crystal display device, a reflecting layer is frequently provided on the back side (opposite to the observation side) of a liquid crystal in the basic cell structure. The reflecting layer generally comprises a metal thin film of aluminum or the like. In the transflective liquid crystal display device, the reflecting layer has an aperture (window) provided for each pixel to transmit light emitted from the backlight through the apertures for transmissive display. In some cases, the reflecting layer is formed as a reflecting electrode having the function of an electrode for applying an electric field to the liquid crystal, or a transparent electrode layer or the like is provided separately from the reflecting layer so that the reflecting layer has only a light reflecting function.

However, a relatively small liquid crystal display device used for a cellular phone or the like has recently been required to display a color image and have higher definition, and thus the reflective or transflective liquid crystal display device has been required to make brighter reflective display. Therefore, as a material for the metal thin film used for forming the reflecting layer, a silver alloy having higher reflectance than that of aluminum, such as an APC (Ag—Pd—Cu) alloy or the like, has recently been used. The silver alloy has low electric resistance, and is thus used as a material for electrodes and wirings. However, the APC alloy generally has low water resistance and thus has a problem in which metal is dissolved from a patterned thin film comprising the APC alloy due to ionization by contact with hot water in the manufacturing process, and electromigration or electric corrosion occurs due to an applied voltage.

Also, the silver alloy generally has low adhesion to glass substrates and thus has a difficulty in forming the reflecting layer directly on the substrate. In this way, the use of a single APC alloy causes various problems. Therefore, a method for providing a laminated structure comprising the reflecting layer and an ITO (Indium Tin Oxide) layer provided above or below the reflecting layer has been proposed for preventing these problems.

When only an alignment film is disposed between the silver alloy and the liquid crystal, the above-described conventional liquid crystal display device is known to have a problem in which a polarity deviation occurs due to a difference in material from a counter transparent electrode, and the silver alloy is dissolved in the liquid crystal. Therefore, it is conceivable that a method comprising laminating a thin film of a conductive metal oxide such as ITO or the like on a silver alloy film to provide a laminated structure is used. However, this method has the problem of easily producing a shape abnormality such as a hillock due to the stress applied from an upper layer and a heating process for forming the upper layer. Therefore, when the silver alloy film is used for an electrode and wiring, an electrical short circuit easily occurs due to the shape abnormality, thereby deteriorating electrical reliability and the yield of the manufacturing line.

Particularly, in forming a sectional structure in which a silver alloy film is held between upper and lower ITO films, the thickness of the upper ITO film provided above the silver alloy film must be significantly increased for completely covering the side surface of the step formed by the thickness of the silver alloy film. Therefore, the internal stress of the upper ITO film is increased, and thermal stress of heating also occurs due to a difference between the thermal expansion coefficients of the silver alloy film and the ITO film, thereby causing the problem of further increasing the stress concentration in the silver alloy film. The internal stress and thermal stress are thought to be a main cause of the shape abnormality such as a hillock or the like in the silver alloy film.

The present invention has been provided for solving the above problems, and an object of the present invention is to provide an electro-optic device comprising a reflecting layer composed of silver only or a silver alloy and having a structure capable of decreasing the occurrence of a shape abnormality such as a hillock or the like in the reflecting layer.

SUMMARY

In order to achieve the object, an electro-optic device of the present invention comprises an electro-optic material disposed between a pair of substrates, and a means for applying an electric field to the electro-optic material, comprising: an underlying conductive layer composed of a conductive-metal oxide, a reflective conductive layer composed of silver or a silver alloy, and a transparent conductive layer composed of a transparent conductor are laminated on one of the substrates, and wherein the transparent conductive layer is thinner than the underlying conductive layer.

In the present invention, the laminated structure comprising theunderlying conductive layer, the reflective conductive layer, and the transparent conductive layer is provided on one of the substrates, and the transparent conductive layer provided on the reflective conductive layer is formed to be thinner than the underlying conductive layer. Therefore, a stress load applied from the transparent conductive layer to the reflective conductive layer can be decreased, thereby suppressing the occurrence of a shape abnormality such as a hillock or the like in the reflective conductive layer. Therefore, the electrical reliability of the electro-optic device can be improved, and product yield can also be improved. Also, since the underlying conductive layer is thicker than the transparent conductive layer, the electrical conductivity can be secured by the underlying conductive layer even when the transparent conductive layer becomes thin as described above. As a result, an increase in electric resistance of an electrode and wiring formed in the above-described laminated structure can be suppressed or decreased.

Since the reflective conductive layer is composed of silver or a silver alloy, both high reflectance and low electric resistance can be provided. In this case, the underlying conductive layer, which is thicker than the transparent conductive layer, and the reflective conductive layer, which has low electric resistance, are laminated, and thus the electric resistance of an electrode and wiring can be further decreased. Thus, an electro-optic device having good electrical characteristics can be manufactured. Furthermore, the transparent conductive layer is formed on the reflective conductive layer, and thus the migration of silver or a silver alloy can be suppressed, maintaining a smooth reflecting surface and further improving electrical reliability.

An electro-optic device of the present invention comprises an electro-optic material disposed between a pair of substrates, and a means for applying an electric field to the electro-optic material, comprising: a material-sealed region where the electro-optic material is sealed; in a material-sealed region, a reflecting electrode having a laminated structure comprising an underlying conductive layer composed of a conductive metal oxide, a reflective conductive layer composed of silver or a silver alloy, and a transparent conductive layer composed of a transparent conductor is formed on one of the substrates; and external wiring comprising the underlying conductive layer or comprising the underlying conductive layer and the transparent conductive layer of the laminated structure, is provided outside the material-sealed region to be conductively connected to the reflecting electrode, wherein the transparent conductive layer is thinner than the underlying conductive layer.

In the electro-optic device, the reflecting electrode comprising the laminate of the underlying conductive layer, the reflective conductive layer, and the transparent conductive layer is provided in the material-sealed region. On the other hand, the external wiring comprising the underlying conductive layer or comprising the underlying conductive layer and the transparent conductive layer of the laminated structure, is provided outside the material-sealed region. Therefore, even when the transparent conductive layer for covering the reflective conductive layer is thin, corrosion and electric corrosion of the silver or silver alloy of the reflective conductive layer can be prevented.

Like the reflecting electrodes, internal wiring having the laminated structure comprising the underlying conductive layer, the reflective conductive layer, and the transparent conductive layer is preferably provided in the material-sealed region. Therefore, wiring resistance in the material-sealed region can be decreased.

In the present invention, the transparent conductive layer preferably has a thickness of 5 nm to 30 nm. With the transparent conductive layer having a thickness of 5 nm or more, the surface of the reflective conductive layer can be prevented from being partially exposed from the transparent conductive layer even in the use of a practical manufacturing process. Also, with the transparent conductive layer having a thickness of 30 nm or less, a stress load applied to the reflective conductive layer from the transparent conductive layer can be decreased to prevent a shape abnormality such as a hillock or the like in the reflective conductive layer.

A method for manufacturing an electro-optic device comprising an electro-optic material disposed between a pair of substrates, and a means for applying an electric field to the electro-optic material of the present invention comprises the steps of forming an underlying conductive layer composed of a conductive metal oxide on one of the substrates, selectively forming a reflective conductive layer composed of silver or a silver alloy on the underlying conductive layer, and forming a transparent conductive layer composed of a transparent conductor and thinner than the underlying conductive layer on the underlying conductive layer and the reflective conductive layer.

In the present invention, the reflective conductive layer is formed on the underlying conductive layer to improve the adhesion of the reflective conductive layer, and the electric resistance of an electrode and wiring can be decreased by the laminated structure. Also, the transparent conductive layer is formed on the reflective conductive layer, and thus a decrease in reflectance of the reflective conductive layer and a decrease in electrical reliability due to migration or the like can be suppressed. Furthermore, the transparent conductive layer is thinner than the underlying conductive layer, and thus a stress load applied to the reflective conductive layer from the transparent conductive layer can be decreased to prevent a shape abnormality such as a hillock or the like in the reflective conductive layer. On the other hand, the underlying conductive layer is thicker than the transparent conductive layer, and thus electric conductivity can be secured by the underlying conductive layer even when the transparent conductive layer is thin as described above. Therefore, an increase in electric resistance of an electrode and wiring can be suppressed or decreased by using the laminated structure.

A method for manufacturing an electro-optic device comprising an electro-optic material disposed between a pair of substrates, and a means for applying an electric field to the electro-optic material of the present invention comprises the steps of forming an underlying conductive layer composed of a conductive metal oxide on one of the substrates, selectively forming a reflective conductive layer composed of silver or a silver alloy on the underlying conductive layer only in a first region corresponding to a material-sealed region in which the electro-optic material is sealed, forming a transparent conductive layer composed of a transparent conductor thinner than the underlying conductive layer on the reflective conductive layer and the underlying conductive layer within the first region, and on the underlying conductive layer in a second region out of the material-sealed region, and simultaneously patterning the underlying conductive layer and the transparent conductive layer.

In the present invention, the laminated structure comprising the underlying conductive layer, the reflective conductive layer, and the transparent conductive layer is formed in the first region corresponding to the material-sealed region, and the laminated structure comprising the underlying conductive layer and the transparent conductive layer is formed in the second region outside the material-sealed region. The underlying conductive layer and the transparent conductive layer are simultaneously patterned to decrease the number of the steps for manufacturing the electro-optic device.

In the present invention, the transparent conductive layer preferably has a thickness of 5 nm to 30 nm. With the transparent conductive layer having a thickness of 5 nm or more, the surface of the reflective conductive layer can be prevented from being partially exposed from the transparent conductive layer even in the use of a practical manufacturing process. Also, with the transparent conductive layer having a thickness of 30 nm or less, a stress load applied to the reflective conductive layer from the transparent conductive layer can be decreased to prevent a shape abnormality such as a hillock or the like in the reflective conductive layer.

An electronic apparatus of the present invention comprises any one of the above-described electro-optic devices, and a control means for controlling the electro-optic device. The electronic apparatus is preferably used for a portable electronic apparatus which is frequently used outdoors and which has a limitation of a power capacity because the electronic apparatus comprises the electro-optic device used as a reflective electro-optic device or transflective electro-optic device.

DETAILED DESCRIPTION

An electro-optic device, a method for producing the same, and an electronic apparatus according to embodiments of the present invention will be described below with reference to the drawings.

Structure of a liquid crystal display device

Figure 1:
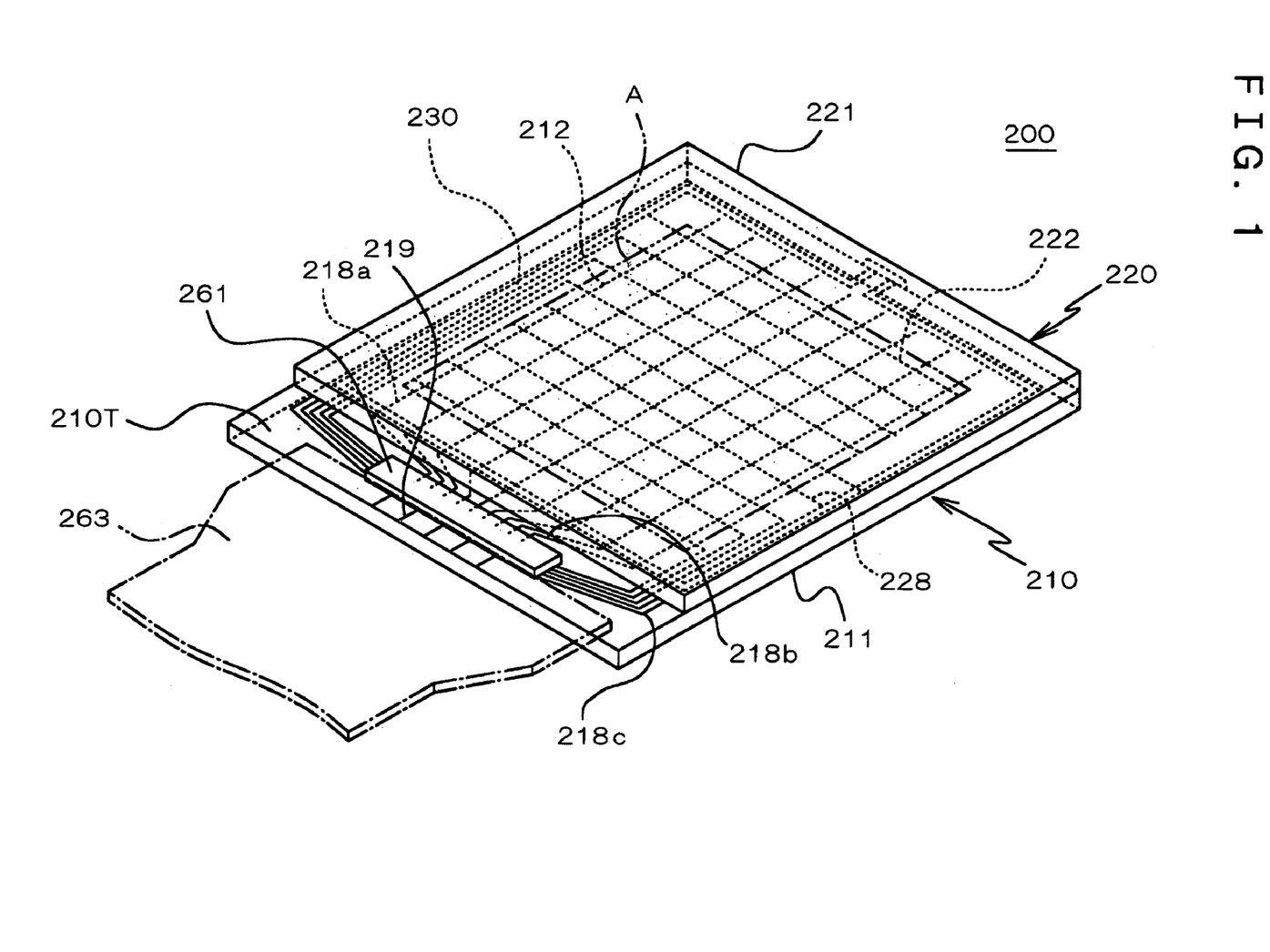
FIG. 1 is a schematic perspective view showing the whole configuration of a liquid crystal display device as an electro-optic device according to an embodiment of the present invention.
Figure 2:
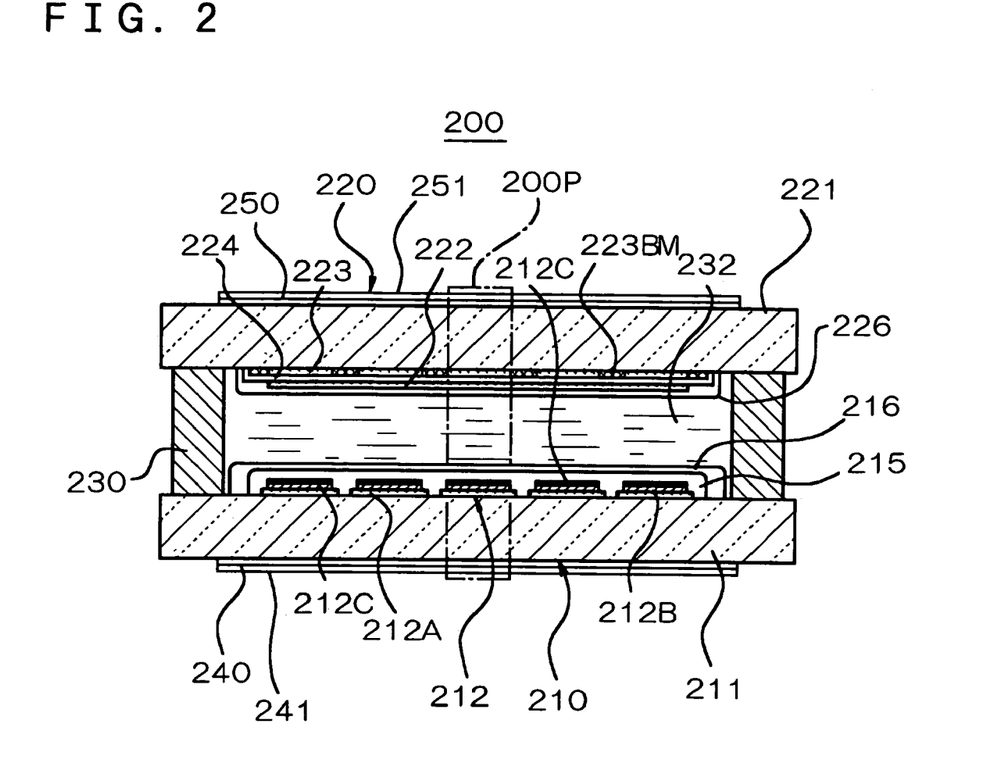
FIG. 2 is a schematic sectional view schematically showing a sectional structure of the liquid crystal display device shown in FIG. 1.
Figure 3:
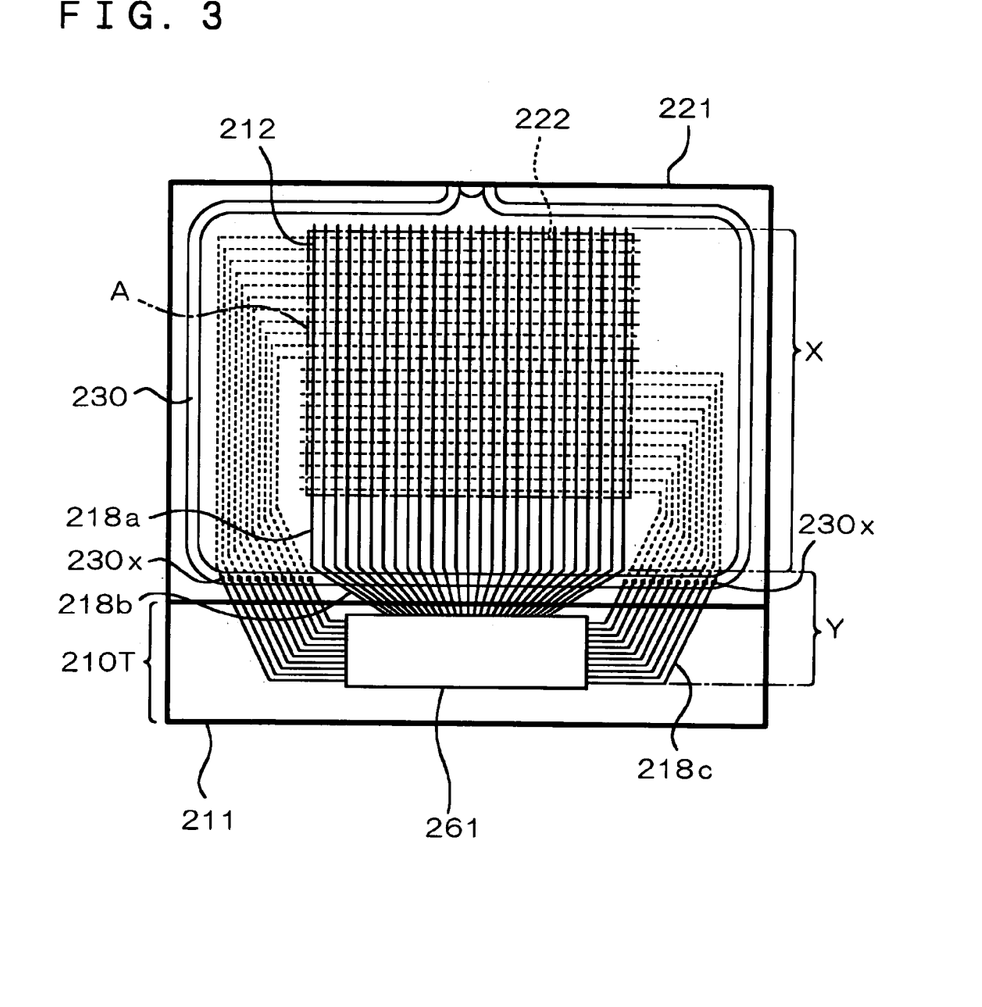
FIG. 3 is a plan view schematically showing a planar structure of the liquid crystal display device shown in FIG. 1.

First, the structure of a liquid crystal display device 200 is described with reference to FIGS. 1 to 3. FIG. 1 is a schematic perspective view of the liquid crystal display device 200 used as an electro-optic device according to an embodiment of the present invention, FIG. 2 is a schematic sectional view schematically showing the sectional structure of the liquid crystal display device 200, and FIG. 3 is a plan view schematically showing the planar structure of the liquid crystal display device 200.

The liquid crystal display device 200 comprises a rear base member 210 including a substrate 211 composed of glass such as alkali-less glass, plastic, or the like, and electrodes and wirings formed on the inner surface of the substrate 211, and a front base member 220 including the same substrate 221 as the substrate 211 and electrodes and wirings formed on the inner surface of the substrate 221, both base members 210 and 220 being bonded together with a sealing material 230. Also, a liquid crystal 232 serving as an electro-optic material is sealed inside the sealing material 230 to form a basic cell structure.

In the display region A shown in FIG. 1, a plurality of reflecting electrodes 212 each having the structure described below is formed on the substrate 211, and a plurality of internal wirings 218a formed integrally with the reflecting electrodes 212 is formed in a liquid crystal-sealed region sealed with the sealing material 230 to be conductively connected to the reflecting electrodes 212. Both the reflecting electrodes 212 and the internal wirings 218a have a strip shape and are arranged in a stripe pattern.

The rear base member 210 including the substrate 211 has a substrate projection 210T projecting outward from the outline of the front base member 220 including the substrate 221. Also, external wirings 218b are formed on the substrate projection 210T to be conductively connected to the internal wirings 218a, and also external wrings 218c are formed on the substrate projection 210T to be drawn from the sealing material 230.

In the region A shown in FIG. 1, a plurality of transparent electrodes 222 each composed of a transparent conductor such as ITO or the like is formed on the substrate 221. The transparent electrodes 222 each have a strip shape and are arranged to have a stripe pattern. The transparent electrodes 222 are extended from the display region A and conductively connected to respective internal wirings 228. The internal wirings 228 are conductively connected to the respective external wirings 218c through vertical conductive portions 230×(refer to FIG. 3) each comprising a part of the sealing material 230.

Furthermore, a semiconductor IC chip 261 is mounted on the substrate projection 210T. The external wirings 218b and 218c drawn to the substrate projection 210T are conductively connected to chip terminals, which are not shown in the drawing, of the semiconductor IC chip 261. The semiconductor IC chip 261 comprises, for example, a liquid crystal driving circuit formed therein. The semiconductor IC chip 261 is also conductively connected to input terminals 219 provided on the substrate projection 210T. The flexible wiring substrate 263 shown by an alternate long and short dash line in FIG. 1 is mounted on the input terminals 219.

In forming a liquid crystal display device capable of color display, a color filter comprising a colored layer 223 and a protective film 224 for covering the colored layer 223 is formed on the inner surface of the substrate 221, as shown in FIG. 2. The colored layer 223 comprises a transparent organic resin containing a pigment or dye. According to demand, a light shielding layer 223BM comprising a black resin or the like is provided between respective pixels 200P (refer to FIG. 2) described below. The protective film 224 is made of a transparent material such as an acrylic resin or the like. The transparent' electrodes 222 are formed on the color filter.

Furthermore, alignment films 216 and 226 each made of a polyimide resin are formed on the surfaces of the rear base member 210 and the front base member 220, respectively. These alignment films 216 and 226 are subjected to an orientation treatment such as rubbing or the like to impart the orientation ability to determine the initial orientation state of the liquid crystal. As shown in FIG. 3, the reflecting electrodes 212 are perpendicular to the transparent electrodes 222 in a plane to form the pixel 200P shown in FIG. 2 in each of the overlaps between both electrodes.

Figure 4A:
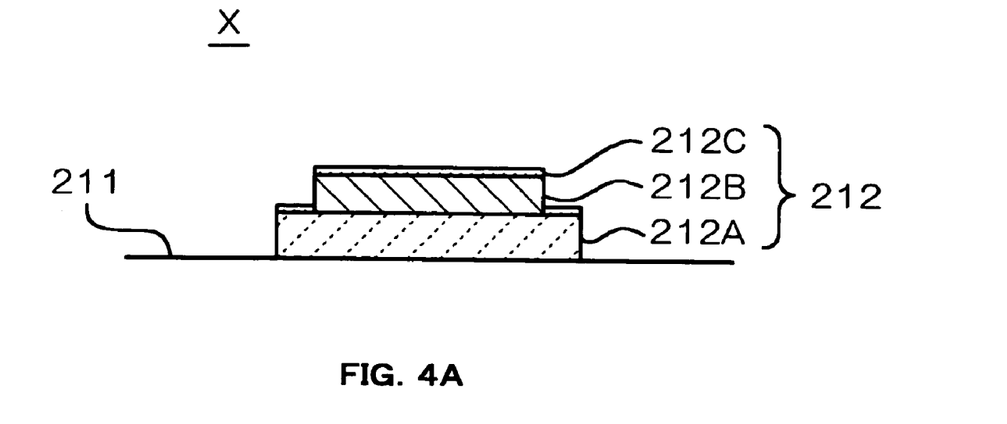
FIGS. 4(a), (b), and (c) are schematic partial sectional views respectively showing structures on a substrate of a rear base member of the liquid crystal display device shown in FIG. 1.

Next, the construction details of the liquid crystal display device 200 will be described below. As shown in FIG. 4(*a*), the reflecting electrodes 212 are formed on the inner surface of the substrate 211, each reflecting conductive electrode 212 having a laminate of an underlying conductive layer 212A composed of a conductive metal oxide such as ITO or the like, a reflective conductive layer 212B composed of silver or a silver alloy and formed on the underlying conductive layer 212A, and a transparent conductive layer 212C composed of a transparent conductor such as ITO or the like and formed on the reflective conductive layer 212B.

The underlying conductive layer 212A is provided for improving adhesion between the reflective conductive layer 212B and the substrate 211 and decreasing the sheet resistivity of each reflecting electrode 212. In order to achieve this result, the thickness of the underlying conductive layer 212A is preferably about 100 nm to 200 nm, and particularly about 150 nm.

The reflective conductive layer 212B can be composed of silver only or any one of various alloys mainly composed of silver. Although the APC alloy is particularly preferred, preferred examples of such an alloy include an alloy composed of about 98% by weight of silver (Ag), and adding platinum (Pt) and copper (Cu); an alloy composed of about 98% by weight of silver (Ag), and adding copper (Cu) and gold (Au); an alloy composed of about 98% by weight of silver (Ag), and adding ruthenium (Ru) and copper (Cu), and the like. The thickness of the reflective conductive layer 212B is preferably about 150 nm to 250 nm, particularly about 200 nm, depending upon the electric resistivity of the alloy used.

The transparent conductive layer 212C is formed to cover the whole surface of the reflective conductive layer 221B. In the embodiment shown in the drawings, the underlying conductive layer 212A is formed over a range slightly wider than the reflective conductive layer 212B, and the transparent conductive layer 212C is also formed on the portions of the surface of the underlying conductive layer 212A, which are not covered with the reflective conductive layer 212B. The transparent conductive layer 212C may have a certain degree of transparency, and sufficient conductivity for use as an electrode for the electro-optic material (liquid crystal). Therefore, the transparent conductive layer 212C is generally composed of a conductive metal oxide having light transparency. Particularly, the transparent conductive layer 212C is preferably composed of ITO.

The thickness of the transparent conductive layer 21.2C is in the range of about 5 nm to 30 nm. With a thickness of less than 5 nm, the transparent conductive layer 212C cannot be easily formed over the entire surface of the reflective conductive layer 212B without defects, thereby easily producing an exposed region in the reflective conductive layer 212B, which is not covered with the transparent conductive layer 212C. In this case, migration easily occurs due to heating or the like in the manufacturing process, and thus the surface of the reflective conductive layer 212B is roughened to decrease reflectance. Therefore, the surface of the reflective conductive layer 212B cannot be protected by the transparent conductive layer 212C to easily cause corrosion or electric corrosion. Also, the reflective conductive layer 212B is partially exposed to cause a problem in which a deviation in polarity occurs due to a difference in material from the counter transparent electrode 222 during driving of the liquid crystal, and the material of the reflective conductive layer 212B is dissolved in the liquid crystal.

On the other hand, with a thickness over 30 nm, the internal stress of the transparent conductive layer 212C increases, and thermal stress applied to the reflective conductive layer 212B from the transparent conductive layer 212C is increased due to a heating temperature, thereby easily causing stress concentration at the edge of the reflective conductive layer 212B. Thus, a shape abnormality such as a hillock or the like easily occurs to deteriorate electrical reliability.

Figure 4B:
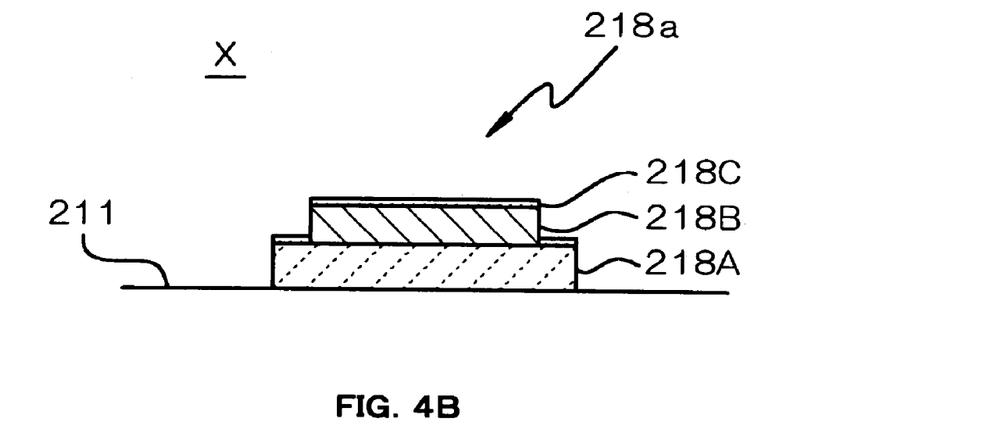

As shown in FIG. 4(*b*), each of the internal wirings 218*a* disposed inside the sealing material 230 comprises the same laminated structure as the reflecting electrodes 212. Namely, the laminated structure comprises an underlying conductive layer 218A composed of a conductive metal oxide such as ITO or the like, a reflective conductive layer 218B composed of silver or a silver alloy, and a transparent conductive layer 218C composed of a transparent conductor such as ITO or the like. The underlying conductive layer 218A and the underlying conductive layer 212A of each reflecting electrode 212 are integrally formed to the same thickness by using the same material at the same time. The reflective conductive layer 218B and the reflective conductive layer 212B of each reflecting electrode 212 are integrally formed to the same thickness by using the same material at the same time. The transparent conductive layer 218C and the transparent conductive layer 212C of each reflecting electrode 212 are integrally formed to the same thickness by using the same material at the same time.

Furthermore, as shown in FIG. 2, a protective film 215 composed of a transparent insulator, for example, an inorganic compound such as $TiO_2$, $SiO_2$, or the like, or a transparent organic resin such as an acrylic resin or the like is formed on the reflecting electrodes 212 and the internal wirings 218*a*. The protective film 215 is provided for protecting the reflecting electrodes 212 and preventing an electric short circuit between the reflecting electrodes 212 and the transparent electrodes 222 through a foreign material entering between the rear base member 210 and the front base member 220.

The reflecting electrodes 212, and the internal wirings 218*a* formed on the substrate 211 shown in FIGS. 4(*a*) and 4(*b*), respectively, are formed over the region X shown in FIG. 3. Namely, the tree-layer structure comprising the underlying conductive layer, the reflective conductive layer, and the transparent conductive layer is formed only in the liquid crystal-sealed region inside the sealing material 230. In other words, the reflective conductive layers 212B and 218B are formed only in the liquid crystal-sealed region.

Figure 4C:
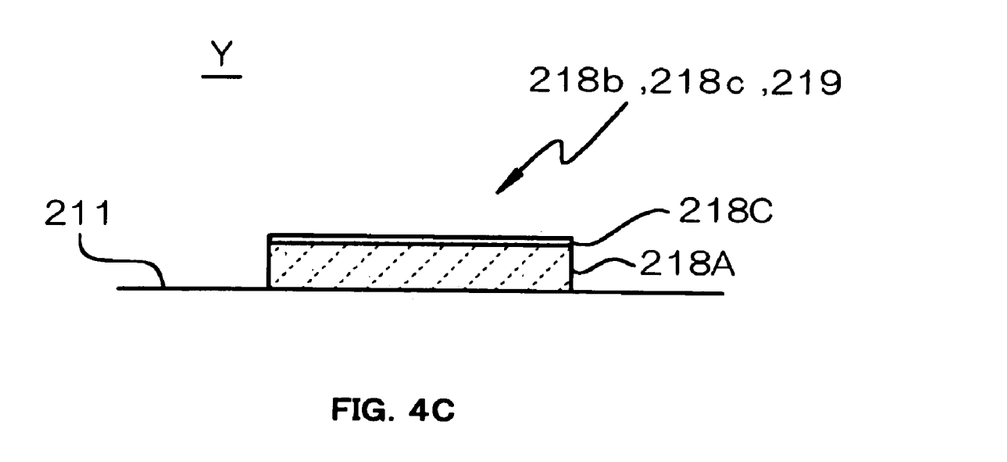

On the other hand, the external wirings 218*b* and 218*c*, and the input terminals 219 are formed outside the liquid crystal-sealed region. However, as shown in FIG. 4(*c*), each of these external wirings comprises only the underlying conductive layer 218A and the transparent conductive layer 218C. Namely, the reflective conductive layer 218B provided in each internal wiring 218*a* is not formed in each of the external wirings 218*b* and 218*c* disposed outside the liquid crystal-sealed region. The liquid crystal-sealed region is generally closed with the sealing material 230. However, in some cases, the substrate projection 210T is finally molded with a silicone resin or the like outside the liquid crystal-sealed region, and the region outside the liquid crystal-sealed region is easily exposed to external contamination, as compared with the liquid crystal-sealed region. Since the reflective conductive layer 218B is not provided in each of the external wirings 218*b* and 218*c* and the input terminals 219, corrosion and electric corrosion of the reflective conductive layer 218B can be prevented. Particularly, in this embodiment, the transparent conductive layers 212C and 218C formed on the reflective conductive layers 212B and 218B, respectively, are thin, as described above, and thus the reflective conductive layer of the laminated structure itself has lower corrosion resistance. Therefore, each of the external wirings disposed outside the liquid crystal-sealed region has the structure (i.e., the structure shown in FIG. 4(*c*)) not containing the reflective conductive layer, as described above, and thus the corrosion resistance of the whole electro-optic device can be effectively improved.

Method for manufacturing a liquid crystal display device

Next, the method for manufacturing the liquid crystal display device 200 as an electro-optic device according to an embodiment of the present invention will be described. First, the step of forming the reflecting electrodes 212, the internal wirings 218*a*, the external wirings 218*b* and 218*c*, and the input terminals 219 on the substrate 211 in the process for manufacturing the rear base member 210 will be described with reference to FIG. 5. FIG. 5 shows only a portion in which the reflecting electrodes 212 are formed.

First, as shown in FIG. 5(*a*), the underlying conductive layer. 212A (218A) composed of ITO is formed on the surface of the substrate 211 by sputtering. As described above, the thickness of the underlying conductive layer 212A (218A) is, for example, 150 nm. After the underlying conductive layer 212A (218A) is deposited on the substrate 211, annealing (or burning) is performed at an appropriate temperature (for example, 150 to 230° C.) according to demand.

Next, as shown in FIG. 5(*b*), a silver layer or silver alloy layer is deposited on the underlying conductive layer 212A (218A) by a sputtering process, an evaporation process, or the like to form the reflective conductive layer 212B (218B). The thickness of the reflective conductive layer is, for example, 200 nm. Then, as shown in FIG. 5(*c*), the reflective conductive layer is patterned to selectively form portions constituting the respective reflecting electrodes 212 and internal wirings 218*a*. Namely, in the region X shown in FIG. 3, the reflective conductive layer is removed from the substrate 211 leaving a pattern comprising a plurality of stripes constituting the respective reflecting electrodes 212 and internal wirings 218*a*. Therefore, the reflective conductive layer remains only on a' first region of the substrate 211 corresponding to the liquid crystal-sealed region.

Figure 5A:
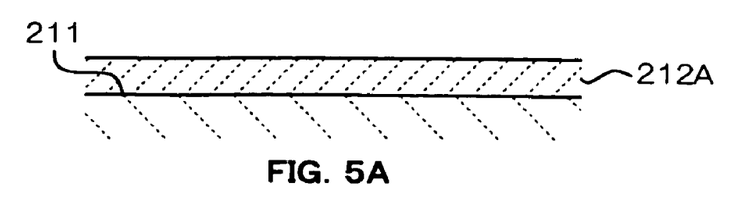
FIGS. 5(a) to 5(e) are sectional views respectively showing steps for manufacturing a structure on the substrate of the rear base member of the liquid crystal display device shown in FIG. 1.
Figure 5B:
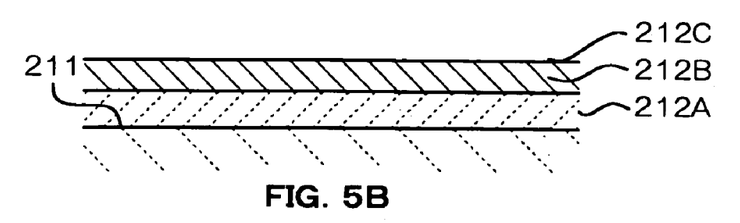
Figure 5C:
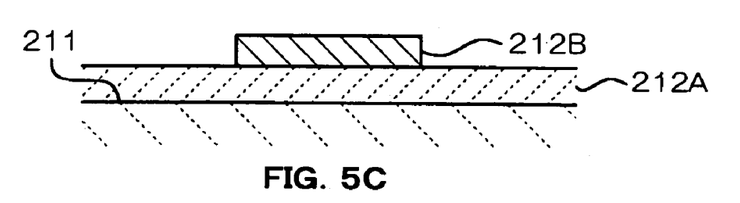
Figure 5D:
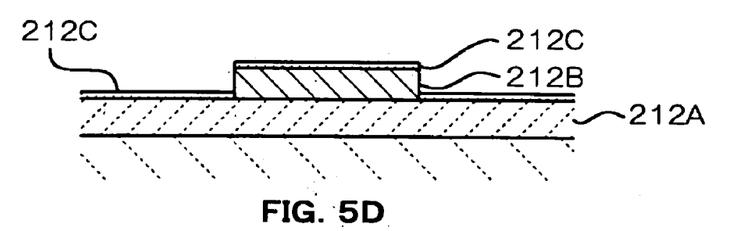

The reflective conductive layer 212B (218B) can be patterned by, for example, a known photolithography process using a photosensitive resist. Namely, the photosensitive resist is patterned by exposure and development to form a mask, and the reflective conductive layer is etched by using the mask. As the etchant used for etching, an etchant having a high etching rate for the reflective conductive layer and a low etching rate for the underlying conductive layer, i.e., high selectivity, is used. An example of such an etchant is a phosphoric acid-system mixed acid etchant.

Next, as shown in FIG. 5(*d*), the transparent conductive layer 212C (218C) composed of ITO is formed on the patterned reflective conductive layer 212B (218B) and the exposed portions of the underlying conductive layer 212A (218A). The transparent conductive layer 212C (218C) is preferably deposited by the same sputtering method as that used for the underlying conductive layer, and then annealed (burned) at a predetermined temperature. The thickness of the transparent conductive layer is; for example, 10 nm. In the region in which the reflective conductive layer is absent, i.e., in a second region outside the first region corresponding to the liquid crystal-sealed range, the transparent conductive layer 212C (218C) is formed directly on the underlying conductive layer 212A (218A).

Figure 5E:
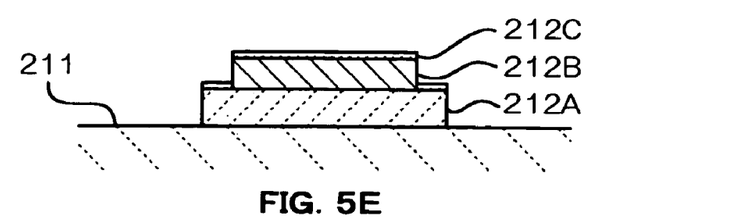

Next, the underlying conductive layer 212A (218A) and the transparent conductive layer 212C (218C) are patterned to form the reflecting electrodes 212, the internal wirings 218*a*, the external wirings 218*b* and 218*c*, and the input terminals 219. In the pattering step, excessive portions are simultaneously removed by using a predetermined mask. Namely, portions other than the reflecting electrodes 212, the internal wirings 218*a*, the external wirings 218*b* and 218*c*, and the input terminals 219 are simultaneously removed from the substrate 211. As the etchant, a strong acid such as aqua regia, or the like can be used. In this way, the underlying conductive layer and the transparent conductive layer are simultaneously patterned, thereby decreasing the number of manufacturing steps and the manufacturing cost.

Characteristics of the Laminated Structure

Next, the three-layer structure of each of the reflecting electrodes 212 and the internal wirings 218*a* will be described in detail below. In the three-layer structure, sheet resistivity necessary for the electrodes and wirings is realized by the underlying conductive layers 212A and 218A and the reflective conductive layers 212B and 218B, and the surfaces of the reflective conductive layers 212B and 218B are covered with the transparent conductive layers 212C and 218C, respectively, to decrease the migration of silver or a silver alloy and mechanical damage.

Figure 6A:
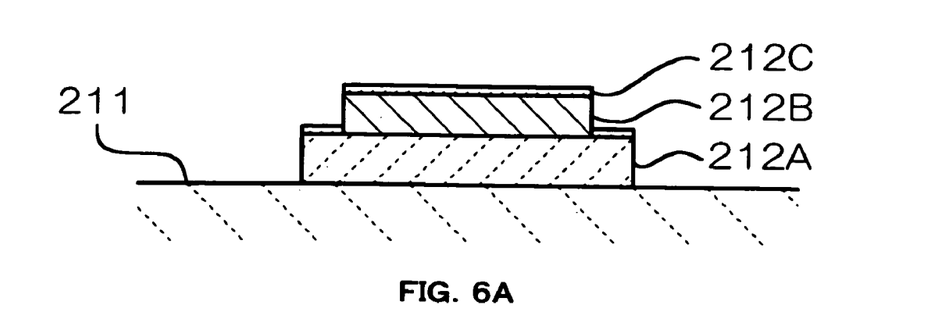
FIG. 6(a) is a schematic partial sectional view showing the structure on the substrate of the rear base member of the liquid crystal display device shown in FIG. 1.
Figure 6B:
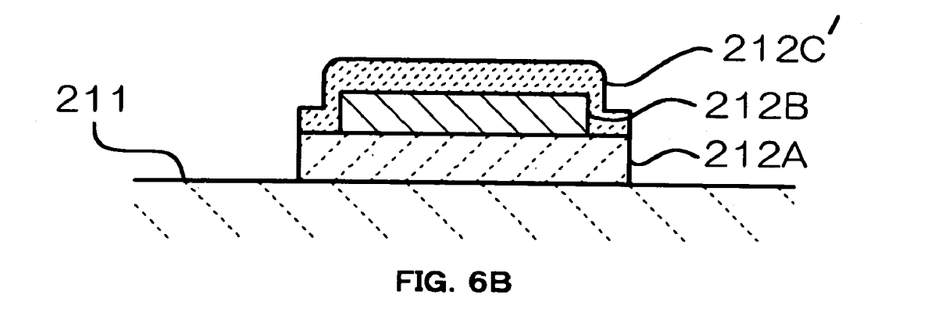
FIG. 6(b) is a schematic partial sectional view showing a structure of a comparative example.

As shown in FIG. 6(*a*), the uppermost transparent conductive layer 212C or 218C is thinner than the underlying conductive layer 212A (218A). This is because when a thick (for example, about 150 to 200 nm) transparent conductive layer 212C' (218C' not shown in the drawing) is formed on the reflective conductive layer 212B (218B), as shown in FIG. 6(*b*), the mechanical stress applied to the reflective conductive layer 212B (218B) from the transparent conductive layer 212C' (218C') due to the internal stress of the transparent conductive layer, and the thermal stress of heating (produced due to a difference between the thermal expansion coefficients of the reflective conductive layer and the transparent conductive layer) are increased to locally increase pressure or strain in a portion (for example, the edge) of the reflective conductive layer, thereby easily producing a shape abnormality such as a hillock or the like. The shape abnormality quite possibly increases the likelihood of an electric short circuit between the adjacent reflecting electrodes 212 and internal wirings 218*a* or between the reflecting electrodes 212 and the transparent electrodes 222 opposing the reflecting electrodes 212 with the liquid crystal 132 provided therebetween. Therefore, the shape abnormality of the reflective conductive layer deteriorates the electrical reliability of the liquid crystal display device 200 and decreases yield.

The thickness of each of the transparent conductive layers 212C and 218C is preferably in the range of 5 nm to 30 nm. With the transparent conductive layers 212C and 218C of less than 5 nm in thickness, the whole surfaces of the reflective conductive layers 212B and 218B are not easily covered to possibly partially expose the surfaces of the reflective conductive layers. When the surfaces of the reflective conductive layers are partially exposed, the surfaces are roughened by migration or the like to quite possibly decrease reflectance and produce a shape abnormality such as a hillock or the like. Therefore, a polarity deviation or dissolution of silver easily occurs during driving of the liquid crystal.

On the other hand, with the transparent conductive layers of over 30 nm in thickness, the stress applied to the reflective conductive layers 212B and 218B from the transparent conductive layers 212C and 218C is increased to locally increase the internal strain of the reflective conductive layers, thereby increasing the probability that a shape abnormality such as a hillock or the like occurs.

Figure 7:
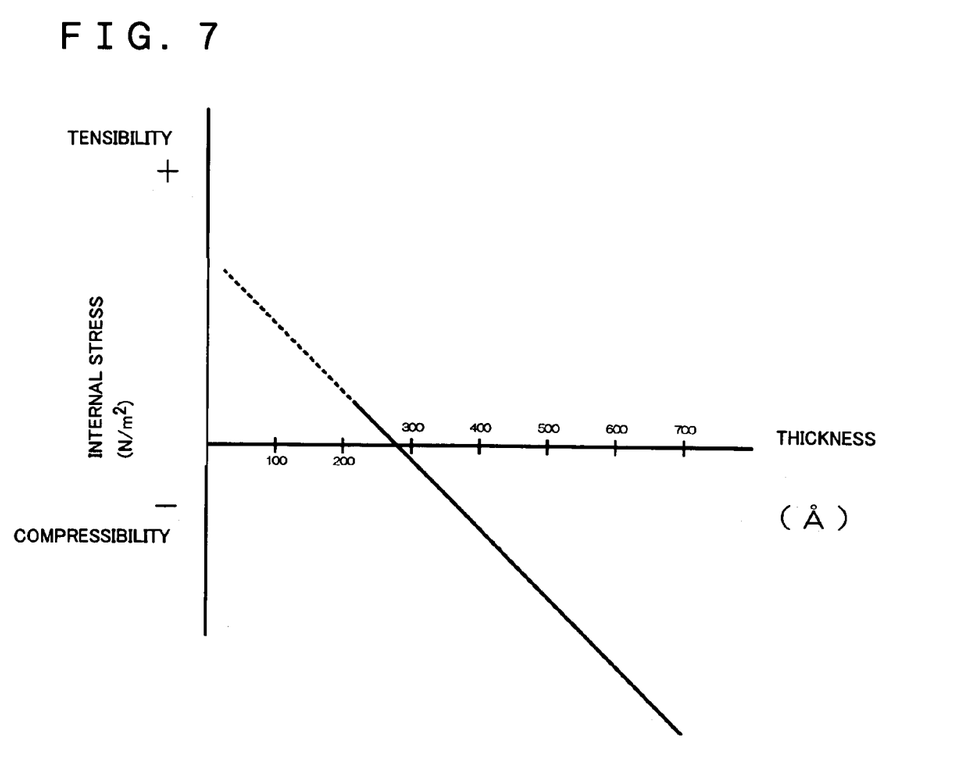
FIG. 7 is a graph showing the relation between the internal stress and thickness of a transparent conductive layer.

For example, in the transparent conductive layers, as shown in FIG. 7, the positive internal stress increases as the thickness increases to impair-conformity with the reflecting conductive layers generally having negative internal stress, easily causing a shape abnormality such as a hillock or the like in the reflecting conductive layers. FIG. 7 shows the relation between the thickness of the transparent conductive layers 212C and 218C and the internal stress (residual stress) thereof. FIG. 7 shows that in the case of positive internal stress (the upper side of the figure), the layers have tensile residual stress resident therein, and in the case of negative internal stress (the lower side of the figure), the layers have compressive residual stress resident therein. In the thickness region of 30 nm or less, the tensile internal stress increases as the thickness decreases. However, even when the tensile internal stress increases, the transparent conductive layers produce less influence on the reflective conductive layers because the reflective conductive layers also have tensile internal stress. Also, in this thickness region, the force applied to the reflective conductive layers does not increase because of the small thickness of the transparent conductive layers, causing less influence on the reflective conductive layers. When the thickness of the transparent conductive layers 121C and 218C exceeds 30 nm, the compressive internal stress increases. The increase in the compressive stress of the transparent conductive layers has a function near the surfaces of the reflecting conductive layers to cause a shape abnormality such as a hillock or the like.

In this embodiment, when the thickness of the transparent conductive layers exceeds 30 nm, the probability of a shape abnormality in the reflecting conductive layers 212B and 218B gradually increases to cause an electrical defect in some cases. On the other hand, when the thickness of the transparent conductive layers is less than 5 nm, the film compactness becomes insufficient, and thus a decrease in reflectance, electric corrosion or the like occurs due to migration.

As described above, in this embodiment, only the transparent conductive thin layers 212C and 218C are formed on the reflective conductive layers 212B and 218B, respectively, and thus the thickness of each of the underlying conductive layers 212A and 218A and the reflective conductive layers 212B and 218B should be secured for sufficiently decreasing the electric resistance of electrodes and wirings. In this embodiment, the total thickness of both layers should be at least about 150 nm.

However, in this embodiment, each of the external wirings 218b and 218c and the input terminals 219 mainly comprises the underlying conductive layer 218A, and thus the thickness of each of the underlying conductive layers 212A and 218A should be set to have a sheet resistivity sufficient to form wiring by using a single layer. Therefore, in order to sufficiently decrease the electric resistance of the external wirings or the like, each of the underlying conductive layers 212A and 218A preferably individually has a thickness of 120 nm or more.

Electronic Apparatus

Figure 8:
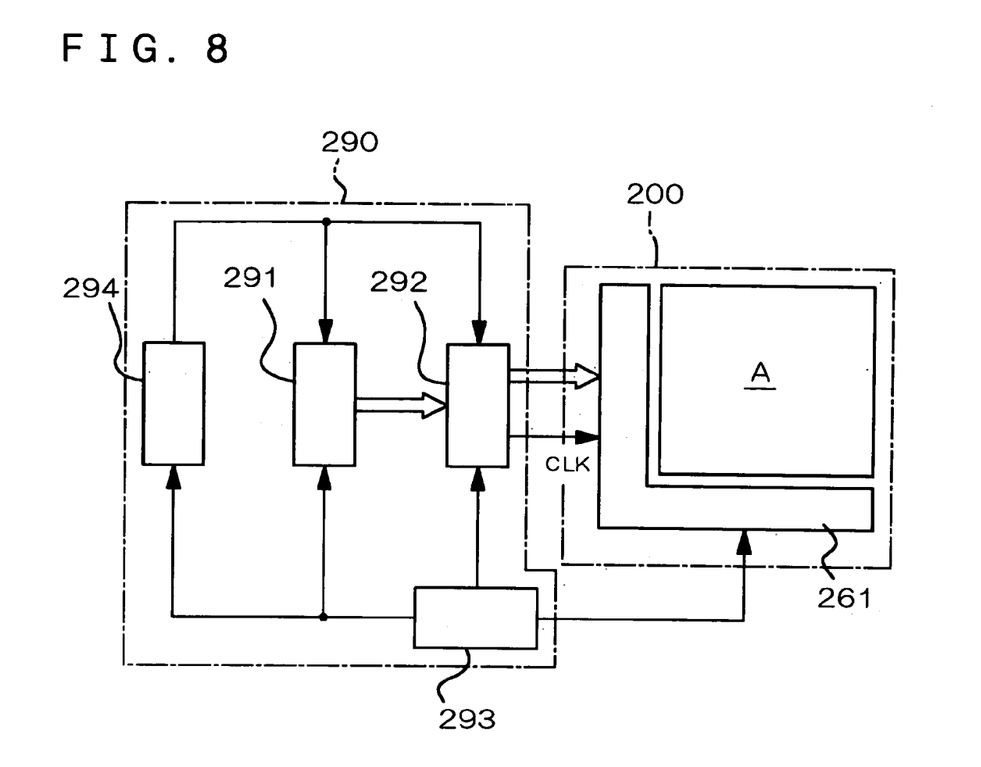
FIG. 8 is a block diagram showing the configuration of a display control system of an electronic apparatus comprising a liquid crystal display device.

Finally, an electronic apparatus according to an embodiment of the present invention will be described with reference to FIGS. 8 and 9. In this embodiment, the liquid crystal panel 200 of the above-described electro-optic device is used as a display means of the electronic apparatus. FIG. 8 is a schematic block diagram showing the whole configuration of a control system (display control system) for the liquid crystal panel 200 in the electronic apparatus of this embodiment. The electronic apparatus comprises a display control circuit 290 including a display information output source 291, a display information processing circuit 292, a power supply circuit 293, and a timing generator 294.

The liquid crystal panel 200 comprises a driving circuit 261 (corresponding to a liquid crystal driving circuit comprising a semiconductor IC chip mounted directly on the liquid crystal panel in the above-described embodiment) for driving the display region A (refer to FIGS. 1 and 3).

The display information output source 291 comprises a memory comprising ROM (Read Only Memory), RAM (Random Access Memory), or the like, a storage unit comprising a magnetic recording disk, an optical recording disk, or the like, and a tuning circuit for synchronously outputting a digital image signal so that display information is supplied in the form of a predetermined format image signal to the display information processing circuit 292 based on various clock signals produced by the timing generator 294.

The display information processing circuit 292 comprises various known circuits such as a serial-parallel converter circuit, an amplifying-inverting circuit, a rotation circuit, a gamma correction circuit, a clamping circuit, and the like, for executing processing of input display information to supply the image information together with a clock signal CLK to the driving circuit 261. The driving circuit 261 includes a scanning line driving circuit, a signal line driving circuit, and an inspection circuit. The power supply circuit 293 supplies a predetermined voltage to each of the above-described components.

Figure 9:
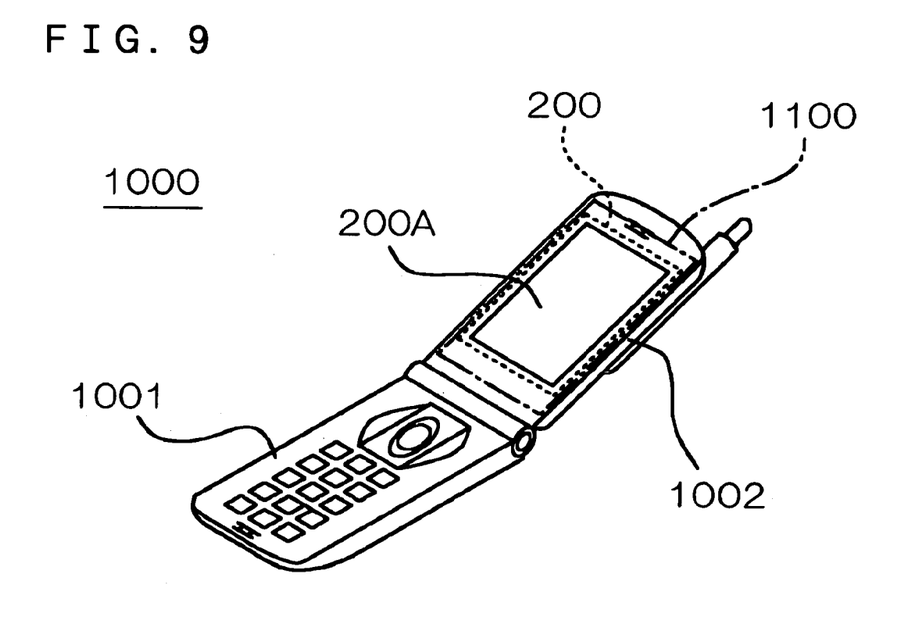
FIG. 9 is a schematic perspective view showing the outline of a cellular phone as an example of electronic apparatuses.

FIG. 9 shows a cellular phone as an electronic apparatus according to an embodiment of the present invention. A cellular phone 1000 comprises an operation section 1001 and a display section 1002. Also, a plurality of operation buttons is arranged on the front face of the operation section 1001, a microphone is incorporated in a transmitting section. Furthermore, a speaker is disposed in a receiving section of the display section 1002.

In the display section 1002, a circuit board 1100 is disposed in a case body, and the above-described liquid crystal panel 200 is mounted on the circuit board 1100. The display surface of the liquid crystal panel 200 disposed in the case body can be seen through a display window 200A.

The electro-optic device and electronic apparatus of the present invention are not limited to above-described embodiments shown in the drawings, and, of course, various changes can be made in the scope of the gist of the present invention. For example, the electro-optic device of each of the above embodiments is a liquid crystal display device having a liquid crystal panel. However, devices using various electro-optic panels other than the liquid crystal panel, such as an inorganic electroluminescence device, an organic electroluminescence device, a plasma display device, a FED (field emission display) device, and the like can be used. Although each of the above embodiments concerns a liquid crystal panel having a so-called COG (chip on glass) structure in which an IC chip is mounted directly on at least one of the substrates, a COF (chip on film) structure in which a liquid crystal panel is connected to a flexible wiring board or TAB board having an IC chip mounted thereon may be used.

Although, in each of the above embodiments, the reflective liquid crystal display device is described as an example, a transflective liquid crystal display device can be formed by providing an aperture for each pixel 200P (refer to FIG. 2) of the reflective conductive layer.

Advantages

As described above, in an electro-optic device of the present invention comprising a reflective conductive layer composed of silver or a silver alloy, the probability of a shape abnormality such as a hillock or the like in the reflective conductive layer can be decreased.

The entire disclosure of Japanese Patent Application No. 2002-311053 filed Oct. 25, 2002 is incorporated by reference.

What is claimed is:

1. An electro-optic device comprising:
   an electro-optic material disposed between a pair of substrates;
   wherein the electro-optic material is sealed in a material-sealed region in which a reflecting electrode is formed on one of the substrates, the reflecting electrode having a laminated structure including:
      an underlying conductive layer formed of a conductive metal oxide laminated on one of the substrates;
      a reflective conductive layer formed on one of silver and a silver alloy laminated on the underlying conductive layer; and
      a transparent conductive layer laminated on the reflective conductive layer and the underlying conductive layer; and
   external wiring provided outside the material-sealed region to conductively connect to the reflecting electrode, the external wiring comprising the the underlying conductive layer formed directly on the transparent conductive layer;
   wherein the transparent conductive layer is thinner than the underlying conductive layer.

2. The electro-optic device of claim 1, wherein the transparent conductive layer has a thickness of 5 nm to 30 nm.

3. An electronic apparatus comprising the electro-optic device of claim 1, and control means for controlling the electro-optic device.

4. A method for manufacturing an electro-optic device including an electro-optic material disposed between a pair of substrates, the method comprising:
   a step of forming an underlying conductive layer formed of a conductive metal oxide on one of the substrates;
   a step of selectively forming a reflective conductive layer formed of one of silver and a silver alloy on the underlying conductive layer in a first region corresponding to a material-sealed region in which the electro-optic material is sealed;
   a step of forming a transparent conductive layer on the reflective conductive layer and the underlying conductive layer in the first region and directly on the underlying conductive layer in a second region out of the material-sealed region, the transparent conductive layer being thinner than the underlying conductive layer; and
   a step of simultaneously patterning the underlying conductive layer and the transparent conductive layer.

5. The method for manufacturing an electro-optic device of claim 4, wherein the transparent conductive layer has a thickness of 5 nm to 30 nm.

6. The method for manufacturing an electro-optic device of claim 4, further comprising controlling the electro-optic device with a control means.

* * * * *